United States Patent Office 2,969,346
Patented Jan. 24, 1961

2,969,346

THREE-COMPONENT CATALYST FOR POLYMERIZING OLEFINS CONTAINING A MIXTURE OF METALS AND A HALOGEN

Harry W. Coover, Jr., and Frederick B. Joyner, Kingsport, Tenn., assignors to Eastman Kodak Company, Rochester, N.Y., a corporation of New Jersey No Drawing. Filed Mar. 31, 1958, Ser. No. 724,914

10 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins using a particular catalyst combination which has unexpected catalytic activity, and which gives products characterized by unusually high crystallinity, softening point, thermal stability, stiffness and being substantially free of noncrystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

In the copending application of Young, Hargis and Reynolds, Serial No. 724,903, filed March 31, 1958, there is described a catalyst for the polymerization of α-monoolefins. This catalyst composition contains a transition metal, a second metal which is either aluminum, zinc or magnesium and a halogen. The catalyst described by Young et al. is quite effective for polymerizing ethylene to form high molecular weight, highly crystalline products. However, when this catalyst composition is used to polymerize propylene and higher molecular weight α-monoolefins, the product contains primarily excessive amounts of relatively low molecular weight polymers which are oils, greases and rubbers. It is one of the objects of this invention to provide a novel process for polymerizing propylene and higher α-olefins wherein the amount of relatively low molecular weight product formed is substantially reduced and the amount of solid crystalline polymer is greatly increased.

When a solid polyolefin of high density and high crystallinity is desired, a catalyst mixture that produces large quantities of oils and rubbers is undesirable and in some instances commercially inadequate.

This invention is concerned with and has for an object the provision of improved processes whereby α-monoolefins and particularly propylene can be readily polymerized by catalytic means to give high molecular weight, highly crystalline polymers. A particular object of the invention is to provide a catalyst combination which has unexpected catalytic activity for the polymerization of α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing a transition metal selected from the group consisting of titanium, zirconium, vanadium, chromium and molybdenum, a second metal selected from the group consisting of aluminum, zinc and magnesium, a halogen selected from the group consisting of chlorine, bromine and iodine, and a fourth component selected from the group consisting of esters, amides, and esteramides having the formulas:

$$P(O)Y_3, PY_3, RC(O)Y, \text{ and } YC(O)(CH_2)_nC(O)Y$$

wherein each Y is an alkylamino ($-NR_2$) or alkoxy ($-OR$), said R being an alkyl radical containing 1 to 8, preferably 1 to 4 carbon atoms, and wherein $n$ is an integer of 1 to 4. The catalytic activity of this mixture was wholly unexpected, particularly since the above mixture in the absence of the fourth component produces large amounts of oils and rubbers in polymerizing propylene and higher monoolefins. The inventive process is carried out in liquid phase in an inert organic liquid and preferably an inert liquid hydrocarbon vehicle, but the process can be carried out in the absence of inert diluent. The process proceeds with excellent results over a temperature range of from 0° C. to 250° C., although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert reaction medium.

The invention is of particular importance in the preparation of highly crystalline polypropylene, the polybutenes and polystyrene although it can be used for polymerizing a mixture of ethylene and propylene as well as other α-monoolefins containing up to 10 carbon atoms. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can be also be cold drawn into ribbons, bands, fibers or filaments of high elasticity and rigidity. Fibers of high strength can be spun from the molten polyolefins obtained according to this process.

As has been indicated above the improved results obtained in accordance with this invention depend upon the particular catalyst combination. Thus, one of the components of the catalyst is a transition metal selected from the group consisting of titanium, zirconium, vanadium, chromium and molybdenum. The second metal in the catalyst is selected from the group consisting of aluminum, zinc and magnesium and the halogen is selected from the group consisting of chlorine, bromine and iodine. If desired, the halogen can be in the form of an interhalogen such as iodine monochloride, iodine monobromide and the like, and the term halogen is intended to include interhalogens. These components of the catalyst mixture can be mixed in any desired manner. For example, the metals can be admixed and the halogen then added to the mixture usually in an inert atmosphere, such as under nitrogen. However, the mixing can be done in an atmosphere of the monomer to be polymerized. It is preferred to add the metals to a solvent that is used as the reaction vehicle, and the halogen is then introduced to the resulting mixture. In some instances it is desirable to heat a mixture of the above catalyst components at a temperature of at least 50° C. to obtain the desired reaction. The fourth component of the catalyst composition is an ester, an amide or an ester-amide having the formula:

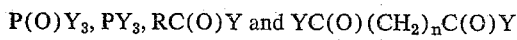

$P(O)Y_3$, $PY_3$, $RC(O)Y$ and $YC(O)(CH_2)_nC(O)Y$

Each Y represents a lower alkylamino or lower alkoxy radical, R is an alkyl radical containing 1 to 8, preferably 1 to 4 carbon atoms and $n$ is an integer of 1 to 4.

Among the specific compounds that can be used are tris-N,N-dimethyl phosphoramide, triethyl phosphate, mixed phosphate ester-amides, triethyl phosphite, N,N-dimethylacetamide, adipamide and the like.

The limiting factor in the temperature of the process appears to be the decomposition temperature of the catalyst. Ordinarily temperatures from 50° C. to 150° C. are employed, although temperatures as low as 0° C. or as high as 250° C. can be employed if desired. Usually, it is not desirable or economical to effect the polymerization at temperatures below 0° C. and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example up to 40% and higher are preferred. Higher concentrations of monomer ordinarily increase the rate of polymerization, but concentrations above 5–10% by weight in a solution process are ordinarily less desirable because the polymer dissolved in the reaction medium results in a very viscous solution.

Preferably from 0.1 to 10 atoms of second metal per atom of transition metal, from 0.1 to 10 atoms of second metal per mole of halogen, and from 0.1 to 0.5 mole of fourth component per mole of halogen are used, but it will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, iso-octane, methyl cyclohexane, tetralin, decalin, and any of the other well-known inert liquid hydrocarbons. The diluents employed in practicing this invention can be advantageously purified prior to use in the polymerization reaction by contacting the diluent, for example in a distillation procedure or otherwise, with the polymerization catalyst to remove undesirable trace impurities. Also, prior to such purification of the diluent the catalyst can be contacted advantageously with a polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing propylene, styrene and other α-monoolefins in accordance with this invention is a mixture of aluminum, titanium, iodine monochloride and hexamethyl phosphoric triamide. The importance of the various components of this reaction mixture is evident from the fact that in the absence of the fourth component large amounts of oils and rubbers are produced in a propylene polymerization. However, when the above phosphoramide or other fourth component within the scope of this invention is added to the mixture the resulting catalyst composition is highly effective for polymerizing propylene to form a highly crystalline, high-density, high-softening polymer.

The invention is illustrated by the following examples of certain preferred embodiments thereof.

Example 1

A 500-ml. pressure bottle containing oxygen-free, dry nitrogen was loaded with a mixture of finely divided metals consisting of aluminum (0.6 gram) and titanium (1.0 gram). The mixture was covered with n-heptane (100 ml.) and iodine monochloride (10.2 grams) was added. The bottle and contents were attached to a propylene source and agitated for 6 hours at room temperature and 30 p.s.i. pressure. The polypropylene formed contained oils and rubbers and substantially no crystalline polymer.

Example 2

The procedure described in Example 1 was followed using 1.5 grams of the catalyst of that example and 0.3 gram of hexamethyl phosphoric triamide. During a 4-hour period of agitation of the reaction mixture at 85° C. under 30 p.s.i. propylene pressure, there was formed 37.5 grams of highly crystalline polypropylene having a density of 0.919 and an inherent viscosity of 2.74 in tetralin at 145° C. The polymer was readily molded into a hard, clear button having a softening point of 161–165° C.

Example 3

Mixed amide esters such as $C_2H_5OP(O)(NR_2)_2$, trioctyl phosphate, triethyl phosphite, N,N-dimethylacetamide and adipamide, when used in place of the phosphoric triamide in Example 2 produce desirable yields of highly crystalline polypropylene.

Example 4

The process of Example 2 was followed using 3-methyl-1-butene as the monomer at a polymerization temperature of 150° C. A 28-gram yield of highly crystalline poly-3-methyl-1-butene was obtained. Good yields of highly crystalline polymer were also obtained using 4-methyl-1-butene, 1-butene, 1-pentene and vinylcyclohexane, styrene and fluorostyrene as monomers.

Thus, by means of this invention polyolefins such as polypropylene are readily produced using a catalyst combination which, based on the knowledge of the art, would not be expected to produce the results obtained. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combination within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:

1. In the polymerization of α-monoolefinic hydrocarbons containing 3 to 10 carbon atoms to form solid crystalline polymer, the improvement which comprises catalyzing the polymerization with a catalytic mixture consisting essentially of metallic titanium, metallic aluminum, iodine monochloride and an organophosphorus compound selected from the group consisting of trialkyl phosphites, trialkyl phosphates and hexaalkyl phosphoramides, the alkyl radicals in said organophosphorus compound containing from 1 to 8 carbon atoms, said catalytic mixture containing 0.1 to 10 atoms of aluminum per atom of titanium, 0.1 to 10 atoms of aluminum per mole of iodine monochloride and 0.1 to 0.5 mole of organophosphorus compound per mole of iodine monochloride.

2. In the polymerization of propylene to form solid crystalline polymer, the improvement which comprises catalyzing the polymerization with a catalytic mixture consisting essentially of metallic titanium, metallic aluminum, iodine monochloride and an organophosphorus compound selected from the group consisting of trialkyl phosphites, trialkyl phosphates and hexaalkyl phosphoramides, the alkyl radicals in said organophosphorus compound containing from 1 to 8 carbon atoms, said catalytic mixture containing 0.1 to 10 atoms of aluminum per atom of titanium, 0.1 to 10 atoms of aluminum per mole of iodine monochloride and 0.1 to 0.5 mole of organophosphorus compound per mole of iodine monochloride.

3. In the polymerization of propylene to form solid crystalline polymer, the improvement which comprises effecting the polymerization in liquid dispersion in an inert organic liquid and in the presence of a catalytic mixture consisting essentially of metallic titanium, metallic aluminum, iodine monochloride and an organophosphorus compound selected from the group consisting of trialkyl phosphites, trialkyl phosphates and hexaalkyl phosphoramides, the alkyl radicals in said organophosphorus compound containing from 1 to 8 carbon atoms, said catalytic mixture containing 0.1 to 10 atoms of aluminum per atom of titanium, 0.1 to 10 atoms of aluminum per mole of iodine monochloride and 0.1 to 0.5 mole of organophosphorus compound per mole of iodine monochloride.

4. In the polymerization of propylene to form solid crystalline polymer, the improvement which comprises effecting the polymerization in liquid dispersion in an inert organic liquid and in the presence of a catalytic mixture consisting essentially of metallic titanium, metallic aluminum, iodine monochloride and hexamethyl phosphoric triamide, said catalytic mixture containing 0.1 to 10 atoms of aluminum per atom of titanium, 0.1 to 10 atoms of aluminum per mole of iodine monochloride and 0.1 to 0.5 mole of hexamethyl phosphoric triamide per mole of iodine monochloride.

5. In the polymerization of propylene to form solid crystalline polymer, the improvement which comprises effecting the polymerization in liquid dispersion in an inert organic liquid and in the presence of a catalytic mixture consisting essentially of metallic titanium, metallic aluminum, iodine monochloride and triethyl phosphite, said catalytic mixture containing 0.1 to 10 atoms of aluminum per atom of titanium, 0.1 to 10 atoms of aluminum per mole of iodine monochloride and 0.1 to 0.5 mole of triethyl phosphite per mole of iodine monochloride.

6. In the polymerization of propylene to form solid crystalline polymer, the improvement which comprises effecting the polymerization in liquid dispersion in an inert organic liquid and in the presence of a catalytic mixture consisting essentially of metallic titanium, metallic aluminum, iodine monochloride and trioctyl phosphate, said catalytic mixture containing 0.1 to 10 atoms of aluminum per atom of titanium, 0.1 to 10 atoms of aluminum per mole of iodine monochloride and 0.1 to 0.5 mole of trioctyl phosphate per mole of iodine monochloride.

7. As a composition of matter, a polymerization catalyst consisting essentially of metallic titanium, metallic aluminum, iodine monochloride and an organophosphorus compound selected from the group consisting of trialkyl phosphites, trialkyl phosphates and hexaalkyl phosphoramides, the alkyl radicals in said organophosphorus compound containing from 1 to 8 carbon atoms, said catalytic mixture containing 0.1 to 10 atoms of aluminum per atom of titanium, 0.1 to 10 atoms of aluminum per mole of iodine monochloride and 0.1 to 0.5 mole of organophosphorus compound per mole of iodine monochloride.

8. As a composition of matter, a polymerization catalyst consisting essentially of metallic titanium, metallic aluminum, iodine monochloride and hexamethyl phosphoric triamide, said catalytic mixture containing 0.1 to 10 atoms of aluminum per atom of titanium, 0.1 to 10 atoms of aluminum per mole of iodine monochloride and 0.1 to 0.5 mole of hexamethyl phosphoric triamide per mole of iodine monochloride.

9. As a composition of matter, a polymerization catalyst consisting essentially of metallic titanium, metallic aluminum, iodine monochloride and triethyl phosphite, said catalytic mixture containing 0.1 to 10 atoms of aluminum per atom of titanium, 0.1 to 10 atoms of aluminum per mole of iodine monochloride and 0.1 to 0.5 mole of triethyl phosphite per mole of iodine monochloride.

10. As a composition of matter, a polymerization catalyst consisting essentially of metallic titanium, metallic aluminum, iodine monochloride and trioctyl phosphate, said catalytic mixture containing 0.1 to 10 atoms of aluminum per atom of titanium, 0.1 to 10 atoms of aluminum per mole of iodine monochloride and 0.1 to 0.5 mole of trioctyl phosphate per mole of iodine monochloride.

References Cited in the file of this patent

UNITED STATES PATENTS

| | | |
|---|---|---|
| 2,827,446 | Breslow | Mar. 18, 1958 |
| 2,832,759 | Nowlin et al. | Apr. 29, 1958 |
| 2,846,427 | Findlay | Aug. 5, 1958 |

FOREIGN PATENTS

| | | |
|---|---|---|
| 526,101 | Italy | May 14, 1955 |